June 3, 1969  E. C. KELLER  3,448,071
FRICTION ELEMENTS
Filed July 10, 1967
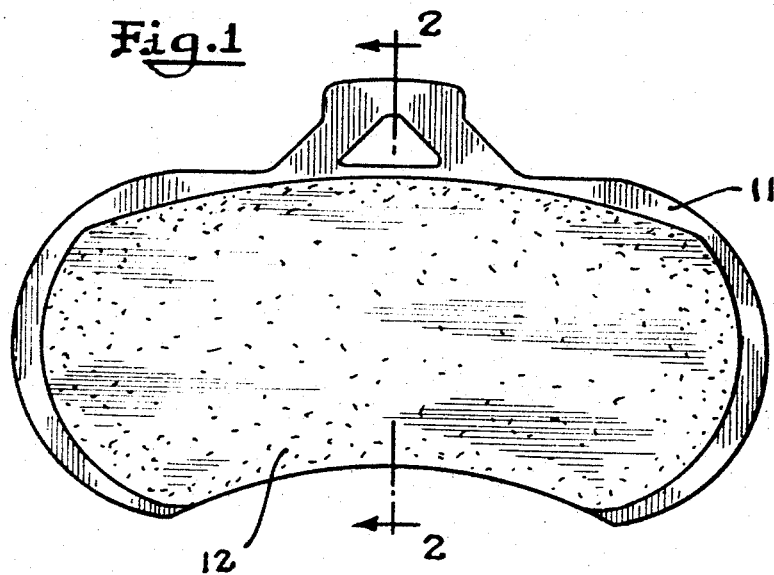
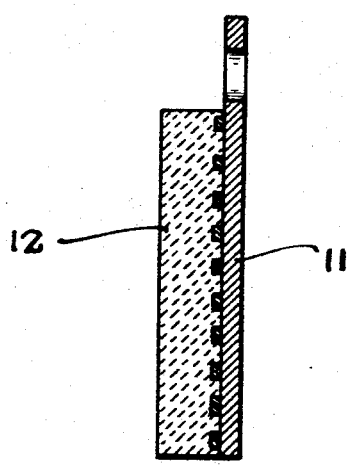
Inventor
EMIL C. KELLER
By Wallace, Kinzer and Dorn
Attorneys

United States Patent Office 3,448,071
Patented June 3, 1969

3,448,071
FRICTION ELEMENTS
Emil C. Keller, Mahwah, N.J., assignor to Abex Corporation, New York, N.Y., a corporation of Delaware
Filed July 10, 1967, Ser. No. 652,103
Int. Cl. C08g *51/04;* C09k *3/14, 3/18*
U.S. Cl. 260—38　　　　　　　　　　　　　2 Claims

ABSTRACT OF THE DISCLOSURE

Superior performance in an automotive or like brake is achieved by incorporating a chromate of an alkali metal in the friction composition.

---

This invention relates to friction elements in the form of pads for disc brakes.

Brakes for automotive vehicles, for the most part, are of the internal expanding type where brake linings on a pair of non-rotating shoes are forced into engagement with the brake drum which rotates with the wheel, thus bringing about the desired deceleration during application of the foot brake. Such engagement is forced by a cam or by a piston of the hydraulic type, and when the force is released, the shoes are returned by a spring means to the normally disengaged position.

Some automobiles, particularly those of European manufacture, are equipped with brakes of the disc type, in which a disc or rotor is located on the inside rim of the wheel. Opposed to this plate is a non-rotating shoe on which is fixed a friction pad corresponding in function to the ordinary brake lining. Again, deceleration is achieved by forcing the friction pad into engagement with the rotating disc when the foot brake is applied.

In the instance of the internal expanding brake, release of the hand brake allows the brake shoes to return to normal disengaged position under the influence of the aforesaid spring means; but this is not so in the instance of releasing the hand brake of an automobile equipped with disc brakes, since the conventional disc brake does not include any return spring means. In fact, most disc brakes are designed so that there is very slight, albeit innocuous, contact between the disc and friction pad even under acceleration conditions.

Experience with certain disc brake designs reveals that the pad occasionally sticks or "freezes" to the disc after the hand brake is released. This freezing of parts, or lack of releasability, is not known to the driver until he endeavors to accelerate. Not only does the phenomenon of lack of releasability simulate a locked brake, but it is a nuisance factor and can also be a hazard, especially to the inexperienced or unwary driver.

Reports on disc brakes establish that the stuck or frozen pad is encountered most frequently in humid coastal areas, suggesting that either a damp or corrosive salt water atmosphere somehow generates an interfacial layer which acts as an interference bond between the disc and pad after the brake has set for awhile. The ferrous metal nature of the opposing rotor or disc perhaps participates in a phenomenon related to electrolysis.

Pads for disc brakes, like brake linings for the ordinary internal expanding brake, are composed primarily of fillers in an organic binder matrix which is usually a thermosetting resin or a mixture of thermosetting resin and a heat stable rubber, stable at least up to about 1000° F., which may be the temperature prevailing at the time of brake engagement to produce deceleration from a high speed. The form of the fillers, the amount thereof in relation to the binder, and the form of the binder are based on considerations such as hardness, wear rate, friction coefficient versus degree of lubricity, heat stability, "fade," "recovery" and like factors well known to brake engineers. The minimum requirements are good resistance to wear and the necessary coefficient of friction which in part are controlled by the design of the brake, in turn dependent upon vehicle performance.

The primary object of the present invention is to prevent freezing between the pad and the disc of a disc brake by including an amount of dry, powdered potassium dichromate in the composition for the pad effective to prevent freezing or adhesion between the pad and disc. Specifically, I have found that potassium dichromate, in an amount no more than about one percent by weight of the friction composition which represents the pad, will minimize the undesired adhesion to the point where it is minimal, inconsequential and virtually unnoticeable to the driver, and such constitutes another expression of the object of my invention.

In brief summary, the invention resides in minimizing a stuck disc brake by incorporating potassium dichromate in the friction pad which is otherwise composed of an organic binder and inorganic fillers of various kinds, the exact form and content thereof being immaterial to the practice of the invention. The chromate is resistant to the severe heat encountered during disc brake action, and as the friction pad wears fresh minute amounts of the chromate are at all times available at the wear surface of the pad, without chemical change, for the desired action in the presence of moisture. The chromate in no way changes the frictional or wear qualities of the pad. While I have stressed potassium dichromate, equivalents are represented by any chromate or dichromate of the alkaline earth metals and the appended claims are to be so interpreted.

Other and further objects of the present invention will be apparent from the following description and claims and are illustrated in the accompanying drawing which, by way of illustration, shows preferred embodiments of the present invention and the principle thereof and what I now consider to be the best mode in which I have contemplated applying that principle. Other embodiments of the invention embodying the same or equivalent principle may be used and changes may be made as desired by those skilled in the art without departing from the present invention.

In the drawings:

FIG. 1 is a plan view of a shoe for a disc brake having affixed thereto a friction pad representative of the present invention; and FIG. 2 is a sectional view on the line 2—2 of FIG. 1.

The manufacture of a friction element, whether it be in the form of an ordinary brake lining (convex at the operating face) or a disc brake pad (flat at the operating face) follows well known procedures. The constituents for the friction element are first mixed to a homogeneous state, and at this time the binder, whether entirely of thermosetting resin or a mixture thereof with a heat stable rubber, is in an incomplete state of heat cure. Thereafter, a measured amount of the mix is incorporated in a die having the desired geometry for the friction element, and heat and pressure are then applied to the mix in the die to consolidate the mix to the desired density and to advance the binder to its state of final cure. The binder is a continuous phase through which are uniformly distributed the various fillers. The friction element thus manufactured is secured to the support or shoe, either by mechanical means or by a strong bond, in no way dependent on the composition of the friction element. The foregoing are not features of the present invention. During densification and thermal cure, the amount of pressure determines density, given a particular mix, and the degree and longevity of temperature are dependent upon the nature of the binder; that is, whether or not the binder is entirely a thermosetting resin such as a straight phenol formaldehyde resin or modified by some other resin, or rubber, or both. Thus, the incorporation of potassium dichromate into any known disc brake pad composition in accordance with the present invention does not require any special processing aids, and any process for producing such pads may be applied to the present invention. It is simply necessary that the potassium dichromate be uniformly dispersed throughout the body of the pad for constant performance. Nevertheless, the following two examples are capable of producing highly acceptable friction elements for disc brakes, and each incorporates a small but effective amount of potassium dichromate in accordance with the present invention:

|  | Examples (parts by weight) | |
|---|---|---|
|  | 1 | 2 |
| Binder: | | |
|   Natural rubber | 4.5 | |
|   Buna N rubber | | 4.5 |
|   Phenol-formaldehyde resin | 7.5 | 7.5 |
|   Cardanol | 2.0 | 2.0 |
| Fillers: | | |
|   Asbestos fibers | 33.5 | 33.0 |
|   Barytes particles | 10.0 | |
|   Copper chips | 10.0 | |
|   Brass chips | | 25.0 |
|   Alumina particles | | 1.0 |
|   Silica particles | | 7.0 |
|   Zinc oxide particles | | 5.0 |
| Friction modifier: | | |
|   Lead particles | 5.0 | |
|   Coke particles | 19.5 | 2.0 |
| Friction enhancer: Harvel dust particles (Cashew nut shell resin) | 5.0 | 5.0 |
| Rubber cure: | | |
|   Sulfur | 2.0 | 2.0 |
|   Litharge | 5.0 | 5.0 |
| Potassium dichromate particles (100 mesh or smaller) | 1.0 | 1.0 |

In testing friction pads for releasability as to "set" disc brake performance, a friction pad is prepared with two holes for the admittance of plain water into one hole and a five percent salt solution (sodium chloride in water) into the other hole. These holes open at the friction or operating face of the respective pad, and each pad is pressed and held against a ferrous metal disc under predetermined conditions of force and time characteristics of a "set" brake. The holes are filled with their respective liquids at specified intervals for ten times to simulate a severe condition, after which is measured the shear force necessary to separate the pad from the disc.

It is found that with insignificant variance, pads of composition represented by Examples 1 or 2 above incorporating potassium dichromate, will release with only about 22% of the shear force required for the same pad containing no potassium dichromate, when water alone is used. When a 5% salt solution is used, the pad incorporating the dichromate will release at about 30% of the shear force required to release the non-dichromate containing pad. In all instances, pads of the present invention release well under the shear force deemed by the European manufacturers to be the maximum tolerance for acceptable brake performance from a driven annoyance standpoint. In fact, under two separate tests, releasability was achieved at about one-third of the tolerance force.

In order that there will be an appreciation of a manifest physical embodiment of my invention, attention is directed to FIGS. 1 and 2. The support or shoe of a disc brake is identified by the reference character 11, and the pad is identified by the reference character 12. However, form and dimensions may vary widely, and of course this is equally true as to the exact composition, the essential features of the invention being a composition friction element composed predominantly of an organic thermosettable resin binder and discrete filler particles dispersed therethrough which impart to the friction element as a whole the desired properties of wear rate and friction coefficient as minimum performance factors, and characterized by the inclusion of potassium dichromate to impart releasability. The preferred amount of the dichromate is of course a matter of kind and not degree as to the amount required to enhance or promote releasability.

Hence, while I have illustrated and described preferred embodiments of my invention, it is to be understood that these are capable of variation and modification.

I claim:
1. A composition friction element composed of an organic thermosettable binder through which are dispersed fillers which impart thereto wear resistance and a desired coefficient of friction, and further characterized by a dispersion of particles of potassium dichromate dispersed in an amount of about one percent by weight of the friction element as a whole.

2. A composition friction element according to claim 1 in the form of a pad for an automative disc brake.

References Cited
UNITED STATES PATENTS

| | | | |
|---|---|---|---|
| 3,244,648 | 4/1966 | Bornstein | 260—38 |
| 3,210,303 | 10/1965 | Biggs. | |
| 3,152,099 | 10/1964 | De Gaugue | 106—306 |
| 2,553,215 | 5/1951 | Schultz. | |
| 2,185,333 | 1/1940 | Denman | 106—36 |
| 2,159,935 | 5/1939 | Sanders | 106—36 |
| 1,963,511 | 6/1934 | Tseng | 106—36 |

MORRIS LIEBMAN, *Primary Examiner.*

R. BARON, *Assistant Examiner.*

U.S. Cl. X.R.

106—36